US009474267B2

(12) United States Patent
Rutledge

(10) Patent No.: US 9,474,267 B2
(45) Date of Patent: Oct. 25, 2016

(54) TURKEY DECOY APPARATUS

(71) Applicant: Donald J. Rutledge, Woodbury, NJ (US)

(72) Inventor: Donald J. Rutledge, Woodbury, NJ (US)

( * ) Notice: Subject to any disclaimer, the term of this patent is extended or adjusted under 35 U.S.C. 154(b) by 193 days.

(21) Appl. No.: 14/055,920

(22) Filed: Oct. 17, 2013

(65) Prior Publication Data

US 2015/0164063 A1 Jun. 18, 2015

(51) Int. Cl.
*A01M 31/06* (2006.01)

(52) U.S. Cl.
CPC ...................... *A01M 31/06* (2013.01)

(58) Field of Classification Search
CPC ..................................... A01M 31/06
USPC .......................................... 43/2, 3
See application file for complete search history.

(56) References Cited

U.S. PATENT DOCUMENTS

| 5,832,649 | A | * | 11/1998 | Kilgore | ................ | A01M 31/06 43/2 |
| 6,212,816 | B1 | | 4/2001 | Babbitt | | |
| 6,408,558 | B1 | | 6/2002 | Cornell, Jr. et al. | | |
| 7,043,865 | B1 | * | 5/2006 | Crowe | ................. | 43/3 |
| 7,272,905 | B1 | * | 9/2007 | Horton | ................ | A01M 31/06 43/2 |
| 7,536,823 | B2 | * | 5/2009 | Brint | ................. | 43/2 |
| 7,562,487 | B2 | | 7/2009 | Barr | | |
| 7,788,840 | B2 | * | 9/2010 | Wyant et al. | ............ | 43/3 |
| 8,191,304 | B2 | | 6/2012 | Poorman | | |
| 8,230,638 | B1 | | 7/2012 | Dunaway | | |
| 8,245,436 | B2 | | 8/2012 | Dunkin | | |
| 8,291,634 | B2 | | 10/2012 | White | | |
| 8,316,575 | B2 | * | 11/2012 | Bradley | ............ | 43/2 |
| 8,484,883 | B2 | * | 7/2013 | Rogers | ............ | 43/2 |
| 2001/0001913 | A1 | * | 5/2001 | Mathews | ........ | A01M 31/06 43/3 |
| 2003/0106253 | A1 | * | 6/2003 | Loughman | ....... | A01M 31/06 43/2 |
| 2004/0107623 | A1 | * | 6/2004 | Brint | ............... | A01M 31/06 43/2 |
| 2005/0150149 | A1 | * | 7/2005 | Highby | ........... | A01M 31/06 43/3 |
| 2007/0039227 | A1 | | 2/2007 | Highby et al. | | |
| 2011/0303806 | A1 | * | 12/2011 | Samaras et al. | ........ | 248/156 |
| 2013/0014422 | A1 | * | 1/2013 | Bullerdick et al. | ............ | 43/3 |
| 2013/0042515 | A1 | | 2/2013 | Tanner et al. | | |
| 2013/0104443 | A1 | * | 5/2013 | Cramer | ........... | 43/2 |
| 2013/0174466 | A1 | * | 7/2013 | Saringer | .......... | 43/2 |
| 2013/0185986 | A1 | * | 7/2013 | Stiffler | ............. | 43/3 |
| 2013/0199076 | A1 | * | 8/2013 | Dean | ............... | A01M 31/06 43/3 |
| 2013/0291422 | A1 | * | 11/2013 | Beal | ............... | A01M 31/06 43/2 |
| 2014/0082992 | A1 | * | 3/2014 | Mettler | ............ | A01M 31/06 43/3 |

* cited by examiner

*Primary Examiner* — Joshua Huson
*Assistant Examiner* — Michael Wang

(57) ABSTRACT

An apparatus that mimics the courtship or mating ritual of a tom turkey and a hen turkey. The device has a base with a rotatable spool that is wound with a cord. A hen turkey decoy is stationary on this base while the cord is pulled forcing a tom turkey mounted on a rod and connected to the spool to rotate around the hen turkey. It has been discovered that the rotation mimics the mating ritual thus attracting other dominate tom turkeys. The simulation brings the other dominate tom turkeys into a close proximately to the decoy apparatus and close enough for a hunter to capture the dominate male turkey.

13 Claims, 4 Drawing Sheets

TURKEY DECOY APPARATUS

BACKGROUND OF THE INVENTION

Turkey decoys are not new to the art. However, a turkey decoy that incorporates motion and interaction with other decoys that simulates the mating rituals of breeding turkeys is. There are many examples of decoys that are not animated.

U.S. Pat. No. 8,191,304 issued to Poorman on Jun. 5, 2012, entitled, Turkey Decoy, is an example of a Turkey decoy. The Poorman decoy is fashioned to represent a male turkey, having a substructure construction of tubular material, including a turkey head supported upright, an integrally extending lengthy support for holding the turkey body, and a downwardly depending tube, for impaling within the ground; and expandable turkey body made of a flexible, nylon material printed to the image of a real life turkey, expands into an open position around the body supporting portion of the tubular structure, to hold the body of the turkey in place. This prior art example lacks the ability to have motion induced during use. It is a prime example of a stationary singular turkey decoy. The fact that it lacks any ability to be a non-stationary device allows the present invention to have a greater utility over this particular piece of prior art.

U.S. Pat. No. 7,562,487 issued to Barr on Jul. 21, 2009, entitled, Decoy Movement System for Simulating Life-Like Movement of Animal Species", provides an example of a decoy mounting and movement system for mounting a hollow animal species decoy and for simulating life-like movements of the animal species between a rest position and a vertically pivoted position which simulates feeding by animal species.

The decoy mounting stake is formed of an elongated upper stake section and an elongated lower stake section interconnected via an elongated vertical return spring capable of bending along its length to create an angle between the upper and lower stake sections, the upper stake section dimensioned for insertion into the hollow of the decoy through an opening in its underside in communication with the hollow of the decoy, wherein the fulcrum for vertical pivoting of the decoy is positioned at the lower end of the upper stake section and the ratio D'/D is less than 0.25, wherein D' is the distance between the underside of the decoy and the fulcrum for vertical pivoting, and D is the length of the upper stake section. This prior art example illustrates feeding of the animal, not mating.

The movements of the present invention are choreographed to display the active courtship between a male turkey and a female turkey. The utility is clear. The present invention has a greater utility, in that, a dominate turkey will take issue with the courtship and perform his own ritual in an effort to win the female turkey, therefore overriding the primal desire to breed over feed.

THE INVENTION

The present invention is an apparatus for decoying turkeys. The apparatus comprises a base that has a bottom surface and a top surface. The base has at least three stabilizer stakes mounted at the bottom surface.

The top surface has rotatably mounted thereon, a spool. The spool has a top surface and an outside top edge.

The top surface of the spool has fixedly mounted near a center point of the spool, a first vertically aligned support stake.

The top surface of the spool has fixedly mounted thereon, near the outside top edge, a coupler for a rod, and mounted in the coupler, a horizontally aligned rod, the rod has a distal end.

The distal end of the rod has mounted thereon a second vertically aligned support stake. The spool has mounted thereon, a predetermined length of cord.

DETAILED DESCRIPTION OF THE DRAWINGS

Figure 1:
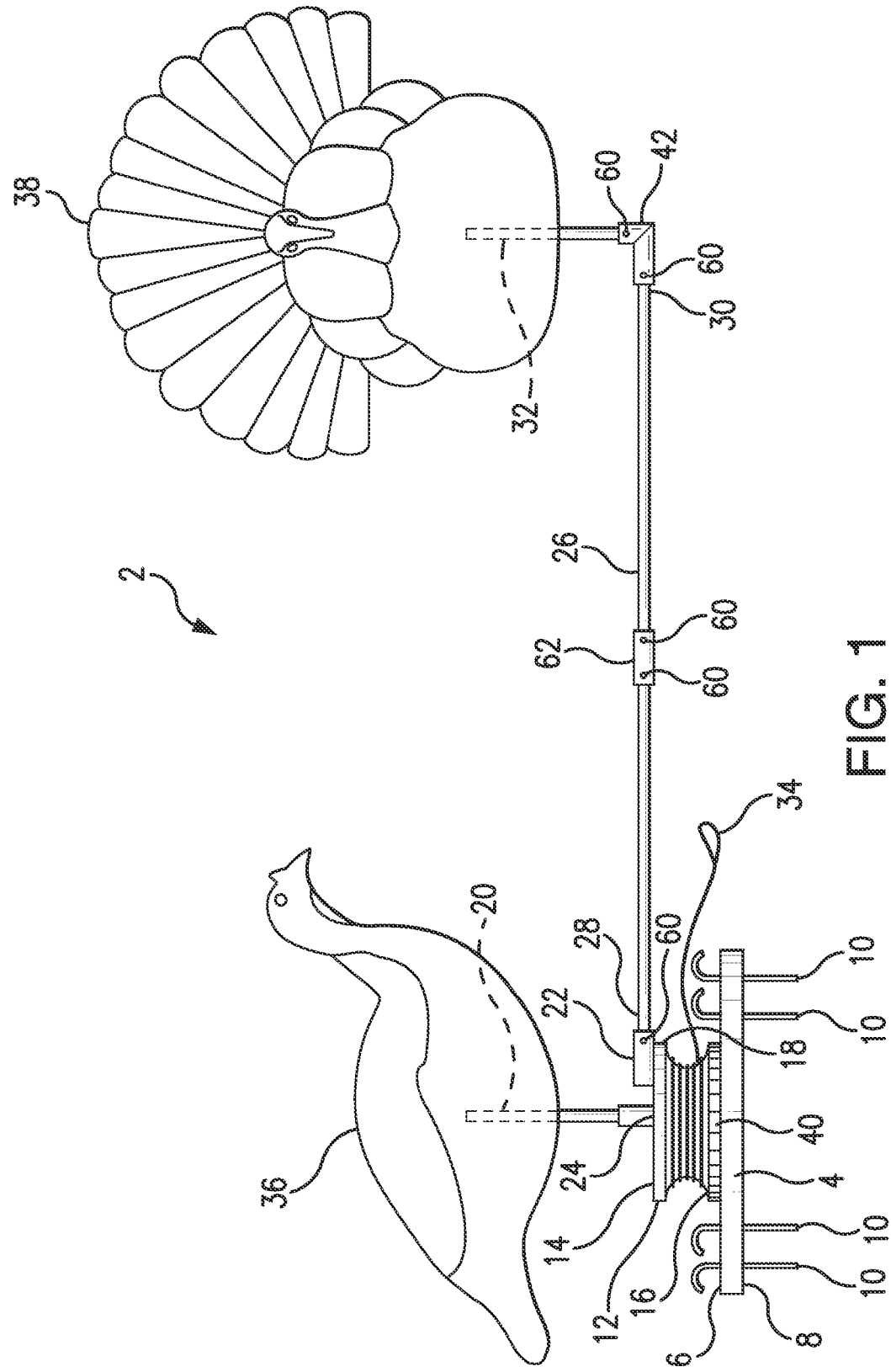
FIG. 1 shows a full side view of the turkey decoy apparatus.

FIG. 1 shows the turkey decoy apparatus 2 from the side. This figure shows the base 4. The base 4 has a top surface 6 and a bottom surface 8. The base 4 is affixed to the ground where the hunter has set up by the stabilizer stakes 10. Here there are four stabilizer stakes 10 but it should be understood that the base 4 requires enough stakes to secure it to the ground. Secured to the top surface 6 of the base 4 is a spool 12. The spool 12 has a top surface 14 and a bottom surface 16. Also present is the outside edge 18 of the spool 12 that supports a first coupler 22. The spool 12 has a center point 24 that supports the first vertically aligned support stake 20.

The outside top edge 18 supports the first coupler 22 which in turn supports the horizontally aligned rod 26. This horizontally aligned rod 26 has a near end 28 and a distal end 30. The near end 28 is supported by the first coupler 22 at the outside top edge 18 of the spool 12. The distal end 30 has a second coupler 42 that supports the second vertically aligned support stake 32.

The first vertically aligned support stake 20 supports the hen decoy 36 while the second vertically aligned support stake 32 supports the tom decoy 38.

The spool 12 is mounted on the base 4 on a bearing 40 that allows the spool 12 to be rotatable. Wrapped around the spool 12 is a cord 34.

This embodiment has set screws 60 that connect the horizontally aligned rods 26 and 28 that are fixed into the couplers 22, 42 and 62. These set screws 60 make the connections easily broken down for transportation purposes. The other embodiments have a single horizontal rod 26 with not center coupler 62. Other embodiments have the rods 26 and 28 permanently fix into the couplers with fasteners such as screws, pins, rivets or any other fasteners that would be suitable to fix the rods 26 and 28 into the couplers 22, 42, and 62. The rods 26 and 28 permanently fix into the couplers 22, 42 and 62 by welding, soldering, gluing or any other suitable way to affix the rods 26 and 28 permanently into the couplers 22, 42 and 62.

Figure 2:
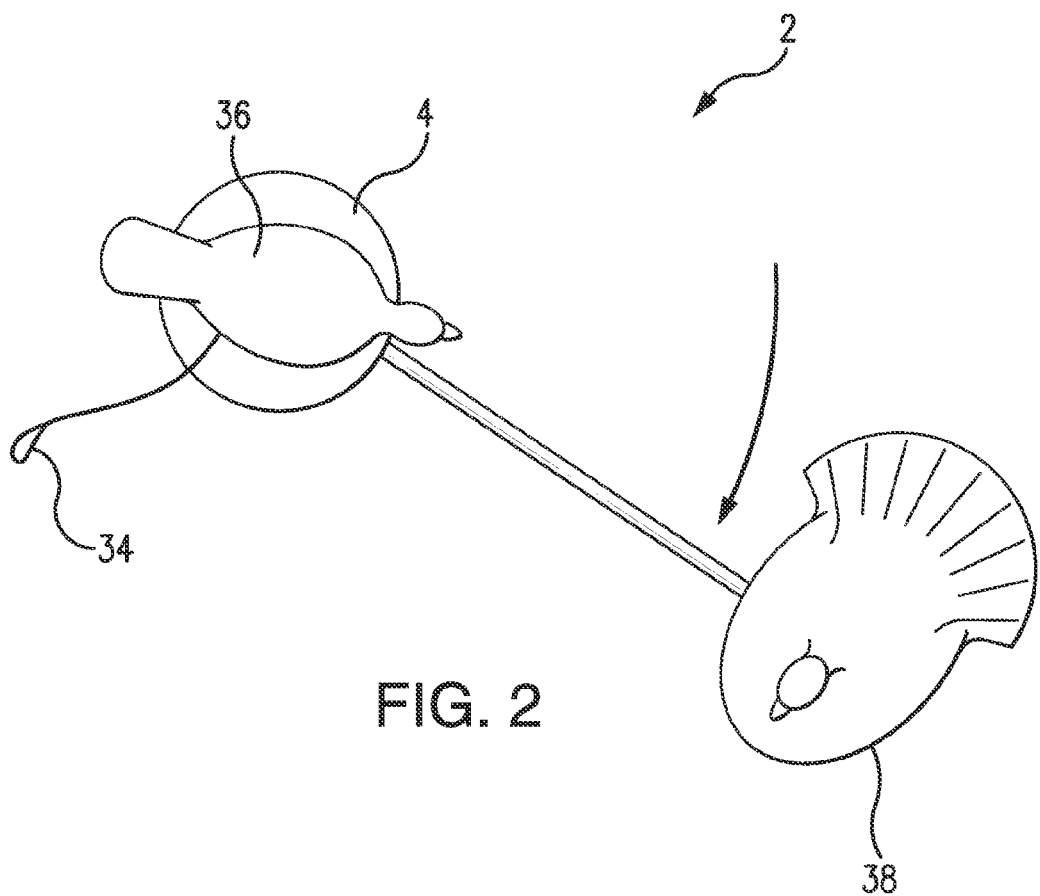
FIG. 2 shows a full top view of the turkey decoy apparatus.

FIG. 2 shows the turkey decoy apparatus 2 from top. The cord 34 that is wrapped around the spool 12 that is mounted on the bearing 40 allows the spool 12 to rotate. When the cord 34 is pulled the tom decoy 38 rotates around the stationary hen decoy 36. It has been discovered that the rotation of the tom decoy 38 around the hen decoy 36 emulates the natural mating ritual of turkeys.

FIG. 1 shows the horizontally aligned rod 26 as a segmented construction. FIG. 2 shows the horizontally aligned rod 26 as a unitary rod. It should be known that the rod 26 can be unitary or segmented in its construction without changing the scope of the invention. It should also be understood that the turkey decoy apparatus 2 and its components are camouflaged to fit the surroundings where it is being deployed. The camouflage will differ with the different venues where the decoy apparatus is deployed.

Figure 3:
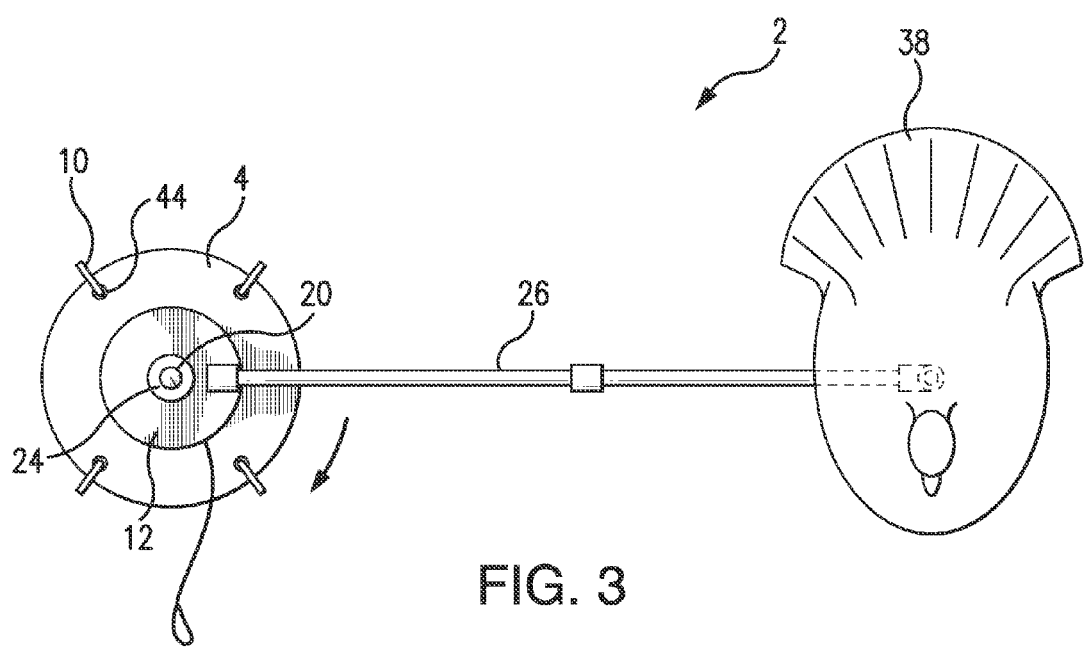
FIG. 3 shows a full top view of the turkey decoy apparatus without the hen decoy, exposing the base.

FIG. 3 shows the turkey decoy apparatus 2 from the top without the hen decoy 36 thereby exposing the base 4. In this embodiment the base 4 has openings 44 that allow the stabilizer stakes 10 stabilize the base 4 to the ground. Also shown are the spool 12 and its center point 24 that supports the first vertically aligned support stake 20. The cord 34 is wound or wrapped around the spool 12 which sits on the bearing 40. When the cord 34 is pulled the spool 12 rotates. The spool 12 rotation rotates the horizontally aligned rod 26 rotating the tom decoy 38 around the base 4. When the hen decoy 36 is mounted on the first vertically aligned support stake 20 the tom decoy 38 is rotating around the hen decoy 36 simulating the mating ritual of the turkey.

The turkey decoy apparatus 2 has as a first and second vertically aligned support stake 20 and 32 respectively that have a hen decoy turkey 36 and tom turkey decoy mounted them.

The turkey decoy apparatus 2 has a horizontally aligned rod 26 that can be manufactured from plastic, fiberglass, wood, carbon fiber, aluminum, and other metals.

The turkey decoy apparatus 2 is shown with one embodiment where the horizontally aligned rod 26 is a unitary piece and the other where it is segmented into two pieces. The horizontally aligned rod 26 is manufactured to be portable meaning the rod has multiple segments.

The turkey decoy apparatus 2 has a horizontally aligned rod 26 with a length that represents the distance that the tom turkey moves around the hen. This distance as well as the horizontally aligned rod 26 varies from around 2 feet to about 6 feet.

Figure 4:
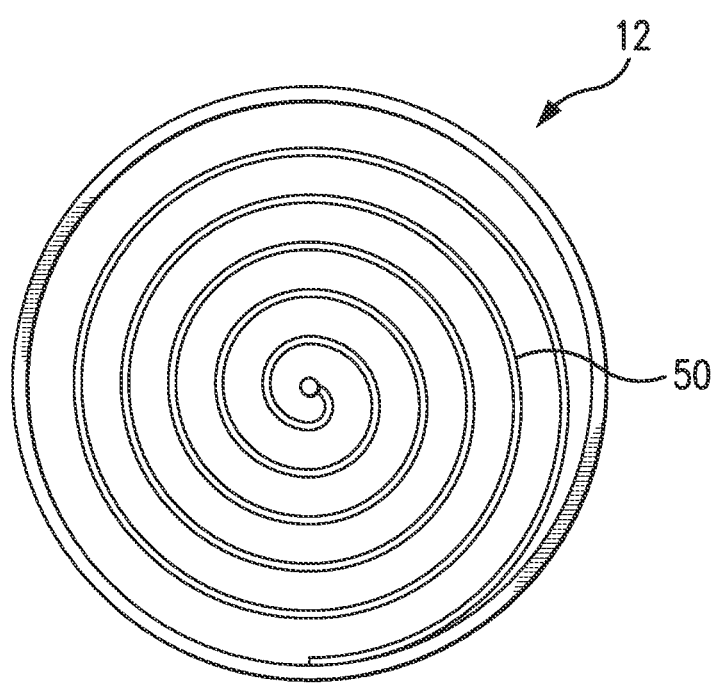
FIG. 4 shows another embodiment where the spool has a coil spring within its interior.

FIG. 4 shows another embodiment where the spool 12 has a coil spring 50 within its interior that recoils the spool 12 instead of manually winding the cord 34 back on the spool 12. So when the cord 34 length has reached its end the coil spring 50 will retract and wind the cord 34 back onto the spool 12 and be ready for use once again.

What is claimed is:

1. An apparatus for decoying turkeys, said apparatus consisting of:
   i. a base having a bottom surface and a top surface, said base having at least three stabilizer stakes mounted at said bottom surface;
   ii. said top surface having rotatably mounted thereon, a spool, said spool having a top surface and an outside top edge;
   iii. said top surface of said spool having fixedly mounted near a center point of said spool, a first vertically aligned support stake;
   iv. said top surface of said spool having fixedly mounted thereon, near said outside top edge, a first coupler for a rod, and mounted in said first coupler, a first horizontally aligned rod, said rod having a distal end;
   v. said distal end of said first horizontal aligned rod having a second coupler attached thereto, a second horizontal aligned rod being attached to said second coupler;
   vi. a distal end of said second horizontal aligned rod having mounted thereon a second vertically aligned support stake;
   vii. said spool having mounted thereon, a predetermined length of cord;
   viii. wherein each said first and second vertically aligned support stake has mounted thereon a decoy turkey.

2. The apparatus as claimed in claim 1 wherein one decoy turkey is a hen and a second decoy turkey is a tom.

3. The apparatus as claimed in claim 2 wherein the hen is mounted on the first vertically aligned support stake.

4. The apparatus as claimed in claim 1 wherein said spool is mounted containing bearings for said spool.

5. The apparatus as claimed in claim 1 wherein said rod is manufactured from aluminum.

6. The apparatus as claimed in claim 1 wherein said rod is manufactured from plastic.

7. The apparatus as claimed in claim 1 wherein said rod is manufactured from fiberglass.

8. The apparatus as claimed in claim 1 wherein said rod is joined such that it will separate into two or more segments.

9. The apparatus as claimed in claim 1 wherein said apparatus is camouflaged.

10. The apparatus as claimed in claim 1 wherein said rod has a length in the range of from 2 feet to 6 feet.

11. The apparatus as claimed in claim 1, wherein said first horizontally aligned rod and said second horizontally aligned rods have set screws to affix them into said couplers.

12. The apparatus as claimed in claim 1, wherein said spool has a coil spring to recoil said spool.

13. The apparatus as claimed in claim 1, wherein said horizontal rods are permanently fixed into said couplers.

\* \* \* \* \*